United States Patent [19]

Reik

[11] Patent Number: 4,813,524

[45] Date of Patent: Mar. 21, 1989

[54] ASSEMBLY FOR DAMPING TORSIONAL VIBRATIONS

[75] Inventor: Wolfgang Reik, Bühl, Fed. Rep. of Germany

[73] Assignee: Luk Lamellen und Kupplungsbau GmbH, Bühl, Fed. Rep. of Germany

[21] Appl. No.: 50,059

[22] Filed: May 13, 1987

[30] Foreign Application Priority Data

Jul. 5, 1986 [DE] Fed. Rep. of Germany ....... 3622679

[51] Int. Cl.[4] ............................ F16D 3/14; F16D 3/66; F16D 3/80
[52] U.S. Cl. .................................... 192/106.2; 74/574; 192/106.1; 464/26; 464/28; 464/66; 464/68
[58] Field of Search .......................... 192/106.2, 106.1; 464/7, 24, 27, 28, 66, 68; 74/574

[56] References Cited

U.S. PATENT DOCUMENTS

| | | | |
|---|---|---|---|
| 2,513,379 | 7/1950 | Thelander | 192/106.2 |
| 2,674,863 | 4/1954 | Thelander | 192/106.2 X |
| 2,944,844 | 7/1960 | Miller | 464/28 |
| 3,476,227 | 11/1969 | Resener | 464/30 X |
| 4,351,167 | 9/1982 | Hanke et al. | 464/68 X |
| 4,565,273 | 1/1986 | Tojima et al. | 192/106.2 |
| 4,674,991 | 6/1987 | Tojima et al. | 192/106.2 X |
| 4,739,866 | 4/1988 | Reik et al. | 464/68 X |

FOREIGN PATENT DOCUMENTS

| | | | |
|---|---|---|---|
| 3322374 | 1/1985 | Fed. Rep. of Germany | 464/66 |
| 3610127 | 12/1986 | Fed. Rep. of Germany | 192/106.2 |
| 2175067 | 11/1986 | United Kingdom | 192/106.2 |

*Primary Examiner*—Rodney H. Bonck
*Attorney, Agent, or Firm*—Peter K. Kontler

[57] ABSTRACT

An assembly for damping torsional vibrations in the power train between the crankshaft of the engine and the input shaft of the change-speed transmission in a motor vehicle has two flywheels which are rotatable relative to each other against the opposition of a damper system which is at least partially confined in an annular chamber containing a supply of viscous fluid. One flywheel is connected to the crankshaft and the other flywheel is connectable with the input shaft of the transmission by a friction clutch. The damper system can include a hydraulic damper, a mechanical damper and one or more friction generating devices.

18 Claims, 1 Drawing Sheet

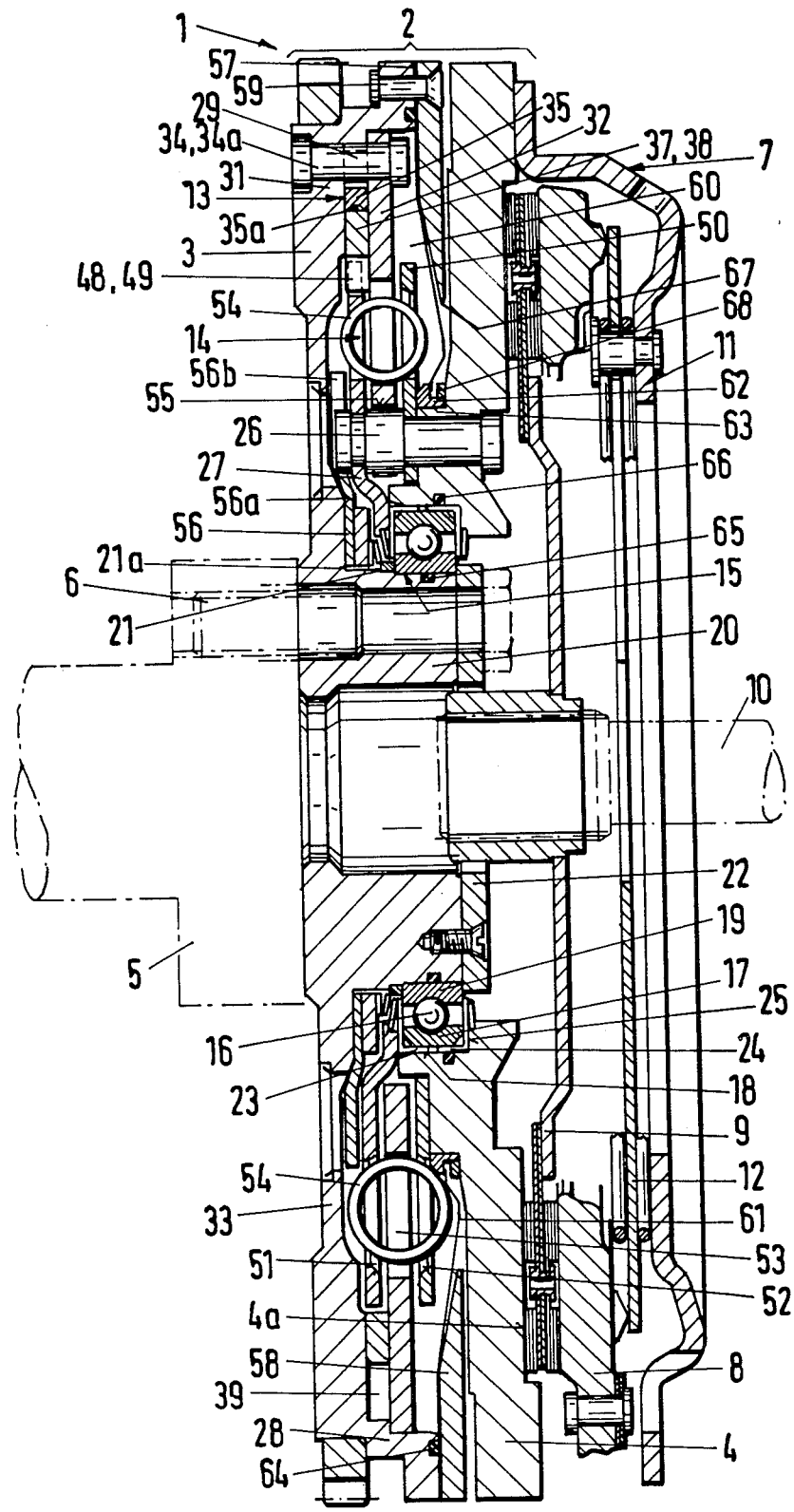

ASSEMBLY FOR DAMPING TORSIONAL VIBRATIONS

CROSS-REFERENCE TO RELATED CASES

The assembly of the present invention constitutes an improvement over and a further development of assembly which is disclosed in commonly owned copending patent application Ser. No. 904,615, now U.S. Pat. No. 4,739,866.

BACKGROUND OF THE INVENTION

The invention relates to improvement in assemblies for damping torsional vibrations, especially in the power trains of motor vehicles, such as automobiles, wherein torque is transmitted between the output element (e.g., a crankshaft) of an internal combustion engine and the input element of a transmission (such as a change-speed transmission).

It is known to provide a torsion damping assembly in the power train between the engine and the transmission of a motor vehicle with a flywheel having two components which are rotatable relative to each other and with damper means for opposing rotation of such components relative to one another. One component of the flywheel is connectable to the output element of the engine and the other component of the flywheel is connectable with the input element of the transmission, preferably by way of a clutch (such as a friction clutch).

It was further proposed to install the damper means in an annular chamber which is at least partially filled with a viscous fluid. This is intended to reduce wear upon the relatively movable parts, to prolong the useful life of the assembly, and to enhance the damping action.

OBJECTS AND SUMMARY OF THE INVENTION

An object of the invention is to provide a torsional vibration damping assembly with improved means for confining the damper means, especially as concerns the prevention of escape of viscous fluid.

Another object of the invention is to provide an assembly whose damping characteristics are superior to those of heretofore known assemblies wherein the damper means is confined in a chamber containing a supply of viscous fluid.

A further object of the invention is to provide an assembly which can be used in a motor vehicle and renders it possible to eliminate or reduce vibrations within the full range of rotational speeds of the engine.

An additional object of the invention is to provide an assembly whose useful life is longer than that of heretofore known assemblies using damper means in a liquid-containing chamber and to construct, assemble and install the damper means in such a way that the wear upon its parts is less pronounced than the wear upon the parts of heretofore known damper means.

Still another object of the invention is to provide an assembly which is not only more reliable, more versatile and longer-lasting than heretofore known assemblies but is also simpler and less expensive and can be put together in a fully automatic machine.

Another object of the invention is to provide a power train which employs the above outlined torsional vibration damping assembly.

A further object of the invention is to provide a motor vehicle which employs the above outlined power train and the above outlined assembly.

An additional object of the invention is to provide a novel and improved method of installing one or more dampers in the power train between the engine and the transmission of a motor vehicle in such a way that the dampers effectively oppose rotation of discrete components of a composite flywheel relative to each other during each desired stage of the RPM range of the engine.

An ancillary object of the invention is to provide a novel and improved mounting for a membrane in the above outlined assembly.

The improved assembly is used to damp torsional vibrations in the power train of a vehicle wherein torque is transmitted between the output element (e.g., a crankshaft) of an engine and the input element of a transmission (such as a change-speed transmission). The assembly comprises a flywheel including first and second components which are rotatable relative to each other, one of which is connectable to the output element of the engine and the other of which is connectable with the input element of the transmission by way of a clutch, such as a friction clutch. The assembly further comprises damper means having means for opposing rotation of the components of the composite flywheel relative to each other, and means for confining at least a portion of the damper means. The confining means has an annular chamber which is arranged to be at least partially filled with a supply of viscous fluid (such as grease or oil), and the confining means has at least one membrane-like member which is located at one side of the chamber. The major part at least of the confining means is preferably provided on the first component, most preferably on the component which is connected or connectable to the output element of the engine.

The first component of the composite flywheel can comprise a substantially radially extending flange which forms part of the confining means and is located opposite the membrane-like member. The annular chamber is disposed between the membrane-like member and the flange of the first component. The latter preferably further comprises an axially extending collar which constitutes a ring-shaped outer wall for the chamber. Such collar is integral with the radially outermost portion of the flange of the first component and surrounds the radially outermost portion of the annular chamber, i.e., the collar can be said to constitute a component part of the confining means for the damper means.

The membrane-like member is preferably elastic in the axial direction of the flywheel and its radially outermost portion is preferably affixed to the collar of the first component. The confining means preferably further comprises a ring-shaped abutment; the membrane-like member extends radially inwardly from the collar of the first component and its radially innermost portion bears against and is axially stressed by the abutment. The latter can constitute a sealing ring which is normally held in sealing engagement with the radially innermost portion of the membrane-like member, at least while the assembly is idle, i.e., when the flywheel does not rotate. The membrane-like member is preferably elastic in the axial direction of the flywheel and is disposed substantially radially of the flywheel. The confining means preferably further comprises an annular back support for a portion at least of the membrane-like member. Such member is disposed between the chamber and the back support. The back support is provided on the aforementioned collar of the first component; it can form an integral part of or it can be riveted or otherwise affixed to the collar, preferably in such a way that the radially outermost portion of the membrane-like member is sealingly clamped between the collar and the back support. The aforementioned abutment is preferably located radially inwardly of the back support and is affixed to or forms an integral part of the second component of the composite flywheel. The membrane-like member can constitute a metallic membrane which is made of spring steel or another suitable springy metallic material.

The arrangement is preferably such that the membrane-like member undergoes axial deformation in response to the action of centrifugal force through the medium of viscous fluid which is confined in the chamber, i.e., in response to rotation of the flywheel. That side of the membrane-like member which faces away from the chamber and the adjacent side of the back support preferably define a space, most preferably an annular wedge-like gap, at least when the flywheel is held against rotation. The width of the gap increases radially inwardly, and such gap enables the membrane-like member to undergo axial deformation in response to the action of centrifugal force until its outer side lies flush against the adjacent side of the preferably rigid (non-elastic and non-deformable) back support. The aforementioned sides of the membrane-like member and of the back support extend substantially in the radial direction of the flywheel. It will be seen that the width of the gap between the membrane-like member and the back support is variable in response to rotation of the flywheel at different speeds; the width can reach a maximum value when the flywheel is idle and can decrease gradually or otherwise in response to increasing RPM of the flywheel.

The assembly can include friction generating means and the energy storing means of such friction generating means can be constituted by the membrane-like member. Thus, the radially innermost portion of the membrane-like member can slide relative to the aforementioned abutment when one component of the flywheel turns relative to the other component and/or vice versa. The abutment can be said to constitute a means for changing the axial stressing of the membrane-like member in response to changing rotational speed of the flywheel. Such means for changing the axial stressing of the membrane-like member can further include the supply of viscous fluid in the chamber and/or the aforementioned back support. The confined viscous fluid can be said to constitute a means for reducing the axial stress upon the membrane-like member in response to increasing rotational speed of the flywheel because centrifugal force acting upon the fluid causes the fluid to move a portion of the membrane-like member axially of the assembly and away from the aforementioned abutment so that the force which develops as a result of frictional engagement between the membrane-like member and the abutment decreases with increasing rotational speed of the flywheel. Otherwise stated, the supply of viscous fluid can be said to constitute a means for varying friction which is generated by the friction generating means including the membrane-like member, preferably in such a way that friction decreases in response to increasing RPM of the flywheel; however, it is also possible to construct the assembly in such a way that friction which is generated by the membrane-like member increases when the RPM reaches a predetermined value.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is an axial sectional view of a torsional vibration damping assembly which is installed between the crankshaft of an internal combustion engine and the input shaft of a change-speed transmission in a motor vehicle and wherein the damper means is confined in a chamber which contains a supply of viscous fluid.

DESCRIPTION OF THE PREFERRED EMBODIMENTS

The drawing shows an assembly 1 which is designed to absorb shocks between the output element 5 (such as a crankshaft) of an internal combustion engine and the input element 10 of a change-speed transmission in a motor vehicle. The assembly 1 comprises a composite flywheel 2 having a first component 3 which is non-rotatably affixed to the output element 5 by an annulus of bolts 6 or analogous fastener means, and a second component 4 which is rotatable relative to the component 3 and can be connected with the input element 10 in response to engagement of a friction clutch 7. The latter comprises a pressure plate 8 which is movable axially of the component 4 and is non-rotatably secured thereto by a set of leaf springs in a manner well known from the art of friction clutches, a clutch disc or clutch plate 9 which has a hub non-rotatably mounted on the input element 10 and friction linings disposed between the pressure plate 8 and the component 4 of the composite flywheel 2, and a diaphragm spring 12 which is tiltably mounted between two annular seats at the inner side of a clutch cover 11 and normally bears upon the pressure plate 8 to urge the latter toward the component 4 so that the friction linings of the clutch plate 9 are clamped between the parts 4, 8 and transmit torque to the input element 10 when the flywheel 2 is rotated by the output element 5 of the engine. The diaphragm spring 12 has customary radially inwardly extending prongs which can be displaced in the axial direction of the assembly 1 to thereby disengage the clutch 7 and to enable the flywheel 2 to rotate with reference to the clutch and input element 10.

The damper means which opposes rotation of the components 3 and 4 relative to each other comprises a first damper 13 which is a hydraulic damper and operates with a supply of viscous fluid in accordance with the so-called displacement principle. The damper means further comprises an elastic mechanical damper 14 which operates in parallel with the damper 13. Each of these dampers opposes but still permits rotation of the components 3 and 4 relative to each other.

The assembly 1 further comprises antifriction bearing means 15 which is interposed between the components 3, 4 of the composite flywheel 2 and includes a single antifriction ball or roller bearing 16 having a single annulus of spherical, cylindrical, barrel-shaped, needle-like or otherwise configurated rolling elements between an inner race 19 and an outer race 17. The outer race 17 is installed in an axial recess 18 of the component 4, and the inner race 19 is mounted on an axial protuberance 20 of the component 3. The protuberance 20 extends axially of and away from the output element 5 and into the recess 18 of the component 4. The inner race 19 is preferably a press fit on the protuberance 20 and is held against axial movement by an annular shoulder 21 which is provided at the periphery of the protuberance 20 and a washer-like retainer 22 which is affixed to the end face of the protuberance 20 by a set of screws or other suitable fasteners. Actually, the shoulder 21 abuts a ring 21a which surrounds the protuberance 20 and, in turn, abuts the adjacent end face of the inner race 19.

The bearing 16 is further held against axial movement relative to the component 4 of the composite flywheel 2. To this end, the outer race 17 is flanked by two ring-shaped members 23, 24 each of which has an L-shaped cross-sectional outline. The radially extending portion of the member 24 abuts a shoulder 25 of the component 4 and the radially extending portion of the member 23 is held in a fixed axial position by a washer-like retaining member 27 which is fixedly secured to the flywheel 4 by distancing elements in the form of rivets 26 each of which is anchored in the component 4. The members 23, 24 together constitute a thermal insulator which prevents or at least strongly interferes with the transfer of heat between the friction surface 4a of the component 4 and the antifriction bearing 16. The surface 4a is in contact with the adjacent friction lining of the clutch plate 9 when the friction clutch 7 is engaged.

The radially outermost portion 28 of the component 3 constitutes an axially extending collar which surrounds a ring-shaped space 29 in the damper 13. The space 29 is flanked by two substantially radially extending walls 31 and 32 which also flank the damper 13. The walls 31 and 32 extend radially inwardly from the collar 28, and the wall 31 constitutes the radially outermost portion of a radial flange 33 forming part of the component 3 of the composite flywheel 2. The flange 33 extends radially between the axial protuberance 20 and the collar 28 of the component 3. The wall 32 is located opposite the wall 31 and constitutes an at least substantially rigid as well as non-elastic washer-like cover or lid extending radially inwardly from the collar 28 toward but short of the protuberance 20 in the space between the flange 33 and the component 4. Rivets 34 or analogous fasteners are provided to rigidly secure the radially outermost portion of the wall 32 to the collar 28.

The hydraulic damper 13 is installed radially outwardly of the mechanical damper 14 and comprises several segment-shaped elements 35 which are located in and divide the ring-shaped space 29 into an annulus of segment-shaped compartments which are equidistant from each other as seen in the circumferential direction of the collar 28. The segment-shaped compartments between the elements 35 directly surround a ring-shaped member 37 which includes a ring-shaped portion 38 having a thickness equal to or approximating the axial distance between the walls 31, 32. Thus, the portion 38 of the ring-shaped member 37 at least substantially seals the radially innermost portions of the compartments (these compartments are portions of the space 29). The radially outermost portion of the ring-shaped member 37 has radially extending arms 39 each of which extends into one of the segment-shaped compartments of the space 29 to subdivide each such compartment into two smaller compartments. The thickness of the arms 39 (as measured in the axial direction of the assembly 1) matches or approximates the width of the corresponding portion of the annular space 29 so that each arm 39 at least substantially seals the respective smaller compartments from each other, especially if one disregards the manufacturing tolerances.

The radially innermost surfaces of the segment-shaped elements 35 are formed with arcuate passages in the form of grooves 35a which extend in the circumferential direction of the collar 28 and establish communication between neighboring smaller compartments. The surfaces surrounding the grooves 35a can be said to constitute flow restrictors for viscous fluid which is confined in the space 29 of the damper 13. Such viscous fluid can be forced to flow through the grooves 35a. The force which is required to induce the flow of viscous fluid through the grooves 35a generates a damping action between the compartments 3 and 4 of the composite flywheel 2. The ring-shaped member 37 is the output element of the damper 13 and its radially innermost portion has radial projections 48 extending into complementary recesses 49 of the aforementioned washer-like retaining member 27 on the component 4. When the component 3 turns relative to the component 4 and/or vice versa, the ring-shaped member 37 and the segment-shaped elements 35 change their angular positions relative to each other to thereby compel viscous fluid to flow through the passages which are defined by the grooves 35a.

The wall 32 at one side of the annular space 29 extends radially inwardly and constitutes the input element of the mechanical damper 14. The latter further comprises a pair of discs which flank the wall 32. These discs include the aforementioned retaining member 27 and a disc 50. The rivets 26 maintain the discs 27 and 50 at a fixed axial distance from each other; these discs constitute the output element of the elastic damper 14 and are respectively provided with registering windows 51, 52 which further register with windows 53 of the wall 32. Each set of registering windows 51, 52, 53 receives an energy storing device in the form of a coil spring 54 acting in the circumferential direction of the collar 28. The coil springs 54 oppose angular movements of the components 3 and 4 relative to each other.

The range of operation of the composite damper means including the hydraulic damper 13 and the elastic mechanical damper 14 (which is installed in parallel with the damper 13) is determined by the length of arcuate slots 55 which are machined into or otherwise formed in the wall 32, which extend in the circumferential direction of the collar 28, and at least one of which receives an intermediate portion of the adjacent rivet 26. In other words, the difference between the diameter of such portion of the rivet 26 and the length of the respective slot 55 determines the magnitude of that angle through which the components 3, 4 can turn relative to each other while the damper 13 and/or 14 is effective to oppose the angular movement.

A friction generating device 56 is installed between the flywheel components 3, 4 and operates in parallel with the elastic mechanical damper 14. The device 56 generates friction in response to turning of the component 3 relative to the component 4 and/or vice versa. A friction disc 56a of the device 56 is turnable by the rivets 26; to this end, the disc 56a has recesses or cutouts 56b into which the heads of the rivets 26 extend. If it is desirable to delay the generation of friction, the heads of the rivets 26 are received in the respective recesses 56b with a certain amount of play in the circumferential direction of the collar 28.

The end face 57 of the collar 28 of the component 3 is in sealing engagement with the radially outermost portion of a washer-like member 61 which can constitute an axially deformable metallic membrane. The member 61 constitutes one sidewall for an annular chamber 60 which is further flanked by the flange 33 of the component 3 and is surrounded by the collar 28. The latter can be said to constitute an outer end wall for the chamber 60 and an element of the means for confining the dampers 13, 14 in such a way that these dampers are in contact with a supply of viscous fluid. The chamber 60 accommodates the hydraulic damper 13, the elastic mechanical damper 14 as well as the friction generating device 56. The confining means further comprises a washer-like annular back support 58 for a portion at least of the membrane-like member 61. The radially outermost portion of the back support 58 is secured to the collar 28 of the component 3 by rivets 59 in such a way that the radially outermost portion of the member 61 is sealingly clamped between the end face 57 of the collar 28 and the radially outermost portion of the back support 58. The latter can be said to constitute a wall which extends radially inwardly from the collar 28 toward but short of the protuberance 20 and is located between the membrane-like member 61 and the component 4 i.e., between the component 4 and the dampers 13, 14.

The composition of the supply of viscous fluid (e.g., a lubricant) in the chamber 60 is or can be the same as that of the fluid in the space 29 of the hydraulic damper 13. The quantity of viscous fluid in the chamber 60 is or can be selected in such a way that the fluid is in contact with the radially outermost portions of convolutions of the energy storing elements 54 of the mechanical damper 14 when the assembly 1 rotates.

The purpose of the membrane-like member 61 is to prevent the escape of viscous fluid from the annular chamber 60 of the confining means for the dampers 13, 14 and friction generating device 56. As mentioned above, the radially outermost portion of the member 61 is sealingly clamped between the end face 57 of the collar 28 and the adjacent portion of the back support 58. The radially innermost portion of the member 61 is sealingly engaged by and bears against a ring-shaped sealing element or abutment 62 which is sealingly secured to the component 4 radially inwardly of the back support 58. The manner in which the radially innermost portion of the member 61 is in sealing engagement with the abutment 62 is such that the member 61 is installed in axially stressed condition. The abutment 62 has a substantially L-shaped cross-sectional outline and is adjacent a shoulder 63 of the component 4. The shoulder 63 extends axially of the assembly 1 toward the component 3. The abutment 62 bears axially against the aforementioned disc 50 of the damper 14. The rivets 26 maintain the disc 50 in contact with the abutment 62 and thereby maintain the latter in contact with the shoulder 63 of the component 4.

Since the radially innermost portion of the member 61 bears against the abutment 62, the member 61 and the abutment 62 generate friction when the components 3, 4 of the composite flywheel 2 are caused to turn relative to each other, i.e., the parts 61, 62 cooperate form a friction generating device which yieldably opposes angular displacements of the component 4 relative to the component 3 and/or vice versa. Such friction develops between the left-hand side of the radially innermost portion of the member 61 and the radially outwardly extending leg of the abutment 62. It is also possible to fixedly secure the member 61 to the abutment 62; the abutment 62 then turns with the member 61 and with the component 3 relative to the component 4 and/or vice versa, and friction is generated between the ring-shaped abutment 62 and the disc 50 which latter is affixed to the component 4.

The member 61 is or can be made of spring steel or an analogous resilient metallic material. It is preferably configured and mounted in such a way that a portion of its right-hand side bears against the adjacent side of the back support 58. The area of surface-to-surface contact between the member 61 and back support 58 increases when the assembly 1 rotates because the viscous fluid in the chamber 60 then deforms the member 61 under the action of centrifugal force and shifts a portion of the member 61 axially toward the component 4 into a larger-area contact with the back support 58. The latter is preferably rigid, i.e., it exhibits a minimum of elasticity or no elasticity at all. The back support 58 prevents excessive deformation of the membrane-like member 61 under the action of centrifugal force, i.e., under the action of the supply of viscous fluid which is confined in the chamber 60. In order to further reduce the likelihood of excessive deformation of the member 61 under the action of centrifugal force (i.e., through the medium of viscous fluid) when the assembly 1 is caused to rotate, the quantity of fluid in the chamber 60 is preferably selected in such a way that it does not extend radially inwardly beyond (or does not extend appreciably beyond) the back support 58 when the engine drives the crankshaft 5 or the shaft 10 transmits torque to the component 4.

The means for sealing the chamber 60 from the surrounding atmosphere further comprises a sealing member 64 which is recessed into the end face 57 of the collar 28 and is compressed between the collar and the adjacent radially outermost portion of the member 61. The sealing member 64 can constitute an O-ring and is installed radially inwardly of the annulus of rivets 59 which secure the back support 58 to the collar 28. An additional ring-shaped sealing element 66 is installed in the flywheel 4 adjacent the axially extending portion of the ring-shaped member 24, and a further ring-shaped sealing element 65 is recessed into the protuberance 20 inwardly adjacent the inner race 19 of the antifriction bearing 16.

The membrane-like member 61 and the back support 58 define a wedge-like gap 67 (at least when the assembly 1 does not rotate), and the width of such gap increases radially inwardly in a direction toward the ring-shaped abutment 62. This gap 67 allows for the aforediscussed deformation of the member 61 in the axial direction of the composite flywheel 2 under the action of centrifugal force when the assembly 1 is set in rotary motion and the supply of confined viscous fluid forms a ring in the outer portion of the chamber 60. The configuration of the gap 67 will determine the extent of axial deformation of the member 61 under the action of centrifugal force, i.e., the deformation will end when the entire left-hand side of the back support 58 is contacted by the adjacent portion of the right-hand side of the membrane-like member 61, provided that the body of confined viscous fluid does not extend radially inwardly beyond the back support 58. That RPM at which the left-hand side of the back support 58 is fully contacted by the member 61 depends upon the quantity of confined viscous fluid, the viscosity of such fluid as well as upon the initial axial stressing of the member 61 and the axial rigidity and spring rate of the member 61.

Frictional damping action which is generated in the region of the radially innermost portion of the membrane-like member 61 when the components 3, 4 rotate relative to each other depends upon the ratio of the force which the viscous fluid applies to the member 61 and upon the force with which the member 61 opposes the force that is applied by the viscous fluid. The arrangement may be such that, when the RPM reaches a preselected value, the force with which the radially innermost portion of the member 61 bears upon the ring-shaped abutment 62 is reduced or drops to zero. In fact, the member 61 can be lifted off the radially extending portion of the abutment 62 to thus ensure that the frictional damping action which is normally produced by the parts 61, 62 is definitely reduced to zero.

The relationship between the quantity of viscous fluid in the chamber 60 on the one hand and the rigidity and initial axial stressing of the member 61 on the other hand can be selected in such a way that the frictional damping action of the member 61 and carrier 62 is pronounced when the RPM is below the idling RPM and that the damping action of the parts 61, 62 upon the movements of the components 3, 4 relative to each other is reduced appreciably or is reduced to zero at or above the idling RPM.

The illustrated assembly 1 comprises an additional friction generating ring 68 which is adjacent the abutment 62 and is mounted on the component 4 so that it can be frictionally engaged by the radially innermost portion of the member 61 when such radially innermost portion has moved away from frictional engagement with the radially extending portion of the abutment 62. Frictional engagement between the additional friction generating ring 68 and the radially innermost portion of the membrane-like member 61 preferably takes place when the RPM is above the idling RPM of the engine.

The supply of viscous fluid in the chamber 60 can have a pasty consistency or its viscosity can be lower, i.e., the fluid can be a grease, an oil or another lubricant having an equivalent viscosity. As mentioned above, it is not necessary that the chamber 60 be filled with viscous fluid; on the contrary, it is often desirable to avoid complete filling of the chamber in order to reduce the likelihood of excessive deformation of the member 61 by the confined viscous fluid under the action of centrifugal force. All that counts is to ensure that the hydraulic damper 13 which operates on the aforediscussed fluid displacement principle invariably receives requisite quantities of viscous fluid when the flywheel 2 rotates and the component 3 tends to turn relative to the component 4 and/or vice versa. Moreover, it is advisable that at least a portion of each energy storing element 54 in the mechanical damper 14 be maintained in at least partial contact with the viscous fluid; this results in a pronounced reduction of wear upon the parts of the damper 14. It is further often desirable (especially if the viscosity of the confined fluid is relatively low, e.g., if the fluid is a low-viscosity oil) to select the quantity of confined fluid in such a way that its upper level is below the lowermost portion of the abutment 62 when the assembly 1 is brought to a halt i.e., when the engine is turned off. This greatly reduces the likelihood of leakage of viscous fluid from the chamber 60. In fact, even if the chamber 60 contains a highly viscous fluid (such as a grease), it is desirable to select the quantity of confined fluid in such a way that the body of fluid which accumulates in the lower portion of the chamber 60 in response to stoppage of the engine (i.e., in response to a reduction of centrifugal force) does not reach the level of the lowermost point of the abutment 62; this ensures that the likelihood of leakage is reduced even if the assembly 1 is operated at elevated temperatures which entail a pronounced reduction of viscosity of the confined fluid. Even if the engine is held at a standstill for a relatively long interval of time which suffices to allow for pronounced cooling and a corresponding increase of viscosity of confined fluid, such fluid is rapidly converted into an annulus which accumulates in the radially outermost portion of the chamber 60 immediately or shortly after the engine is started again. In other words, the damper 13 is ready to function and the damper 14 is properly lubricated practically instantaneously upon renewed starting of the engine, even if the viscosity of the confined fluid is high or very high.

The improved assembly is susceptible of many additional modifications without departing from the spirit of the invention. For example, the illustrated hydraulic damper 13 can be replaced with a differently constructed and/or dimensioned hydraulic damper which may but need not operate on the fluid displacement principle (note the passages or grooves 35a), the assembly can employ a different mechanical damper and/or a different friction generating device 56, and the illustrated antifriction bearing means 15 can be replaced with other types of bearing means, e.g., a bearing means with two discrete antifriction bearings or with an antifriction bearing having two or more annuli of rolling elements. Furthermore, the composite flywheel can comprise more than two components which turn relative to each other. Still further, the means for confining the damper means of the improved assembly can include two membrane-like members, one at each side of the chamber 60.

An important advantage of the membrane-like member 61 is that it can compensate for manufacturing tolerances of the adjacent parts, such as the ring-shaped abutment 62 and the back support 58. This is due to the fact that the radially innermost portion of the member 61 need not be fixedly secured to the abutment 62 and/or to the additional frictional generating ring 68. The material, thickness, resiliency and/or other characteristics of the member 61 can be readily selected in such a way that it adequately seals the respective portion of the chamber 60 exclusively due to the fact that its radially innermost portion is stressed axially by the radially extending portion of the abutment 62 so that there is no need for the establishment of a fixed connection between such parts. Another advantage of the member 61 is that its axial stressing can be selected with a view to compensate for wear, even after extensive use of the improved assembly. Thus, adequate axial stressing of the member 61 will ensure that the wear upon its radially innermost portion and/or upon the radially extending portion of the abutment 62 will not result in leakage of confined viscous fluid even if the wear upon such radially innermost portion of the member 61 and/or upon the radially extending portion of the abutment 62 is quite pronounced as a result of repeated angular displacement of the component 3 relative to the component 4 and/or vice versa. Such ability of the member 61 to compensate for wear and/or for machining tolerances prolongs the useful life of the damper means and of the entire assembly 1 as well as of the power train in which the assembly is put to use.

The axially stressed member 61 further ensures that the components 3, 4 of the composite flywheel 2 are held against stray movements in the axial direction of the assembly 1 and that the antifriction bearing 16 is held in an optimum axial position (because the components 3, 4 are held against axial movement relative to each other). As shown, the member 61 is fixedly secured to one (3) of the components 3 and 4 and indirectly bears axially upon the other component (4) through the medium of the abutment 62 or friction generating ring 68, depending upon the momentary RPM of the engine which drives the crankshaft 5. Exact axial positioning of the bearing 16 prolongs its useful life.

When the radially innermost portion of the member 61 bears upon the radially outwardly extending portion of the abutment 62, the axial force which is indirectly transmitted to the component 4 tends to shift the component 4 in a direction toward the component 3, i.e., in the direction in which the component 4 tends to move when a bearing or another suitable clutch actuating device (not shown) is operated to tilt the diaphragm spring 12 relative to the clutch cover 11 in a direction to disengage the clutch 7. However, it is equally possible to select the direction of action of the axially stressed member 61 upon the component 4 in such a way that this action is counter to the direction of action of the clutch actuating device.

As shown, the means for confining the supply of viscous fluid for operation of the damper 13 and for lubrication of the damper 14 is mounted on the component 3. The confining means can be said to include the flange 33, the collar 28, the member 61, the back support 58 and the carrier 62. Such mounting of the confining means is preferred at this time because the supply of viscous fluid is kept at a greater distance from the locus of heat generation (along the surface 4a of the component 4) during engagement and disengagement of the clutch 7. This will be readily appreciated since a high percentage of heat which is generated by the friction clutch 7 is dissipated before it can reach the component 3, i.e., not only the component 3 but also the supply of viscous fluid in the chamber 60 is subjected to relatively low thermal stresses.

The feature that the flange 33 and the collar 28 constitute component parts of the means for confining a supply of viscous fluid for operation of the damper 13 and for lubrication of the damper 14 contributes to simplicity, compactness and lower cost of the assembly 1. The flange 33 performs the additional function of forming part of the torque transmitting connection between the composite flywheel 2 and the crankshaft 5 of the engine.

Mounting of the radially outermost portion of the back support 58 on the collar 28 of the component 3 in such a way that the radially outermost portion of the member 61 is sealingly clamped between the parts 28 and 58 contributes to simplicity, compactness and lower cost of the assembly 1 because the fasteners (rivets 59) which are used to fix the back support 58 to one of the components 3, 4 simultaneously perform the function of securing the member 61 to the first component 3 of the composite flywheel 2. The abutment 62 can form an integral part of the flywheel 4; this even further reduces the cost and enhances the simplicity of the assembly.

The characteristics of the member 61 can be selected in such a way that it undergoes axial deformation in response to each change of the RPM of the engine or that such axial deformation takes place only within one or more selected ranges of the RPM.

As explained above, the member 61 can form the energy storing part of an additional or auxiliary friction generating device 61, 62, 68 which is provided in addition to or in lieu of the friction generating device 56 and is active whenever the component 3 turns relative to the component 4 and/or vice versa, i.e., whenever the radially innermost portion of the member 61 and the abutment 62 or friction generating ring 68 are caused to slide relative to each other. As also explained above, the action or effectiveness of such additional or auxiliary friction generating device (including the member 61) can be altered in response to changing RPM and can be reduced to zero if the radially innermost portion of the member 61 is out of contact with the parts 62 and/or 68 within one or more selected ranges of rotational speed of the engine. In accordance with a presently preferred embodiment, the curvature of the radially innermost portion of the member 61 is selected in such a way that frictional engagement between such radially innermost portion and the abutment 62 decreases in response to increasing RPM of the engine which drives the crankshaft 5 and the component 3. The friction generating ring 68 will be used if it is desire, in a particular power train, to ensure that the radially innermost portion of the member 61 be moved into a progressively increasing frictional engagement with an adjacent part when the RPM of the engine increases or at least while the RPM of the engine increases within one or more selected ranges.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An assembly for damping torsional vibrations in the power train of a vehicle wherein torque is transmitted between the output element of an engine and the input element of a transmission, comprising a flywheel including first and second components which are rotatable relative to each other, one of which is connectable to the output element of the engine and the other of which is connectable with the input element of the transmission by way of a clutch, such as a friction clutch; damper means having means for opposing rotation of said components relative to each other; and means for confining at least a portion of said damper means, said confining means having an annular chamber arranged to be at least partially filled with a viscous fluid, and said confining means including a membrane-like member at one side of said chamber, said member being elastic in the axial direction of said flywheel and extending substantially radially of said flywheel, said confining means further comprising an annular back support for a portion at least of said member and said member being disposed between said chamber and said back support.

2. The assembly of claim 1, wherein at least the major part of said confining means is provided on said first component.

3. The assembly of claim 1, wherein said first component includes a substantially radially extending flange forming part of said confining means and being located opposite said member, said annular chamber being disposed between said member and said flange.

4. The assembly of claim 3, wherein said confining means further comprises a substantially ring-shaped outer wall forming part of said first component, surrounding said chamber and being adjacent said flange.

5. The assembly of claim 1, wherein said confining means further comprises a substantially ring-shaped outer wall extending in the axial direction of said flywheel and surrounding said chamber, said member having a radially outermost portion affixed to said outer wall, said confining means further comprising an abutment and said member extending radially inwardly from said outer wall and being axially stressed by and in sealing engagement with said abutment.

6. The assembly of claim 1, wherein said first component has an axially extending annular collar surrounding said chamber and forming part of said confining means, said back support being provided on said collar.

7. The assembly of claim 6, wherein said member has a ring-shaped portion which is clamped between said collar and said back support.

8. The assembly of claim 1, wherein said confining means further comprises an abutment which is disposed radially inwardly of said back support, said member having a portion extending beyond said back support and being sealingly engaged and axially stressed by said abutment.

9. The assembly of claim 1, wherein said membrane-like member includes a metallic membrane.

10. The assembly of claim 1, wherein said member includes a first portion secured to said first component and a second portion, and further comprising a ring-shaped sealing element provided on said second component and sealingly engaging the second portion of said member.

11. The assembly of claim 1, wherein said back support and said member include portions extending in the radial direction of said flywheel and being spaced apart from each other.

12. The assembly of claim 11, wherein said portions of said back support and said member define a substantially wedge-like annular gap whose width increases radially of and toward the axis of said flywheel.

13. The assembly of claim 12, wherein the width of said gap is variable in response to rotation of said flywheel.

14. An assembly for damping torsional vibrations in the power train of a vehicle wherein torque is transmitted between the output element of an engine and the input element of a transmission, comprising a flywheel including first and second components which are rotatable relative to each other, one of which is connectable to the output element of the engine and the other of which is connectable with the input element of the transmission by way of a clutch, such as a friction clutch; damper means having means for opposing rotation of said components relative to each other; and means for confining at least a portion of said damper means, said confining means having an annular chamber arranged to be at least partially filled with a viscous fluid, and said confining means including a membrane-like member at one side of said camber, said member being elastic and undergoing deformation in the axial direction of the flywheel under the action of centrifugal force upon the viscous fluid in said chamber in response to rotation of said flywheel.

15. An assembly for damping torsional vibrations in the power train of a vehicle wherein torque is transmitted between the output element of an engine and the input element of a transmission, comprising a flywheel including first and second components which are rotatable relative to each other, one of which is connectable to the output element of the engine and the other of which is connectable with the input element of the transmission by way of a clutch, such as a friction clutch; damper means having means for opposing rotation of said components relative to each other; means for confining at a least a portion of said damper means, said confining means having an annular chamber arranged to be at least partially filled with a viscous fluid, and said confining means including a membrane-like member at one side of said chamber, said member being elastically deformable in the axial direction of said flywheel and being installed in axially stressed condition; and friction generating means operating between said components and including energy storing means, said energy storing means including said member.

16. The assembly of claim 15, further comprising means for varying the friction which is generated by said friction generating means.

17. An assembly for damping torsional vibrations in the power train of a vehicle wherein torque is transmitted between the output element of an engine and the input element of a transmission, comprising a flywheel including first and second components which are rotatable relative to each other, one of which is connectable to the output element of the engine and the other of which is connectable with the input element of the transmission by way of a clutch, such as a friction clutch; damper means having means for opposing rotation of said components relative to each other; means for confining at least a portion of said damper means, said confining means having annular chamber arranged to be at least partially filled with a viscous fluid and said confining means including a membrane-like member at one side of said chamber, said member being elastically deformable and being installed in axially stressed condition; and means for changing the stressing of said member in response to changing rotational speed of said flywheel.

18. The assembly of claim 17, wherein said means for changing the stressing of said member includes means for reducing the axial stress upon said member in response to increasing rotational speed of said flywheel.

* * * * *